(12) United States Patent
El-Khamy et al.

(10) Patent No.: US 10,862,630 B2
(45) Date of Patent: Dec. 8, 2020

(54) METHOD AND SYSTEM FOR CONTIGUOUS HARQ MEMORY MANAGEMENT WITH MEMORY SPLITTING

(71) Applicant: Samsung Electronics Co., Ltd., Gyeonggi-do (KR)

(72) Inventors: Mostafa El-Khamy, San Diego, CA (US); Arvind Yedla, San Diego, CA (US); SangHyuck Ha, Gyeonggi-do (KR); Hyunsang Cho, Seoul (KR); Inyup Kang, San Diego, CA (US)

(73) Assignee: Samsung Electronics Co., Ltd

( * ) Notice: Subject to any disclaimer, the term of this patent is extended or adjusted under 35 U.S.C. 154(b) by 985 days.

(21) Appl. No.: 14/847,320

(22) Filed: Sep. 8, 2015

(65) Prior Publication Data

US 2016/0241362 A1 Aug. 18, 2016

Related U.S. Application Data

(60) Provisional application No. 62/116,094, filed on Feb. 13, 2015.

(51) Int. Cl.
*H04L 1/18* (2006.01)
*H04L 5/00* (2006.01)

(52) U.S. Cl.
CPC .......... *H04L 1/1835* (2013.01); *H04L 1/1822* (2013.01); *H04L 5/001* (2013.01); *H04L 5/0055* (2013.01)

(58) Field of Classification Search
CPC .... H04L 1/1835; H04L 5/0053; H04L 1/1812
See application file for complete search history.

(56) References Cited

U.S. PATENT DOCUMENTS

| 8,060,801 | B2 | 11/2011 | Seol et al. |
|---|---|---|---|
| 8,291,278 | B2 | 10/2012 | Cho et al. |
| 8,483,061 | B2 | 7/2013 | Lerzer et al. |
| 8,537,037 | B2 | 9/2013 | Majonen |
| 8,583,976 | B2 | 11/2013 | Tao et al. |
| 8,694,731 | B2 | 4/2014 | Tao |

(Continued)

FOREIGN PATENT DOCUMENTS

| CN | 101505212 | 8/2009 |
|---|---|---|
| CN | 102541808 | 7/2012 |

OTHER PUBLICATIONS

Taiwanese Examination Report dated Mar. 18, 2019 issued in counterpart application No. 10820243140, 7 pages.

(Continued)

*Primary Examiner* — Charles C Jiang
*Assistant Examiner* — Voster Preval
(74) *Attorney, Agent, or Firm* — The Farrell Law Firm, P.C.

(57) ABSTRACT

Apparatuses (including user equipment (UE) and modem chips for UEs), systems, and methods for UE downlink Hybrid Automatic Repeat reQuest (HARQ) buffer memory management are described. In one method, the entire UE DL HARQ buffer memory space is pre-partitioned according to the number and capacities of the UE's active carrier components. In another method, the UE DL HARQ buffer is split between on-chip and off-chip memory so that each partition and sub-partition is allocated between the on-chip and off-chip memories in accordance with an optimum ratio.

13 Claims, 6 Drawing Sheets

(56) References Cited

U.S. PATENT DOCUMENTS

| | | | |
|---|---|---|---|
| 8,724,742 B2 | 5/2014 | Nimbalker et al. | |
| 2002/0016887 A1 | 2/2002 | Scales | |
| 2011/0029834 A1 | 2/2011 | Yang et al. | |
| 2012/0087396 A1* | 4/2012 | Nimbalker | H04L 1/1835 375/219 |
| 2012/0331241 A1 | 12/2012 | Majonen | |
| 2013/0051289 A1* | 2/2013 | Hsieh | H04L 1/1845 370/280 |
| 2014/0086302 A1* | 3/2014 | Felix | H04L 1/005 375/240 |
| 2015/0109996 A1* | 4/2015 | Lee | H04L 1/1825 370/328 |
| 2015/0124740 A1 | 5/2015 | Chen et al. | |
| 2016/0088635 A1* | 3/2016 | Davydov | H04L 1/1845 370/329 |
| 2016/0174216 A1* | 6/2016 | Jain | H04L 1/1812 370/336 |
| 2016/0227540 A1* | 8/2016 | Chen | H04L 5/0064 |
| 2017/0222764 A1* | 8/2017 | Scherb | H04L 1/1861 |
| 2017/0257849 A1* | 9/2017 | Oketani | H04L 1/1812 |

OTHER PUBLICATIONS

Bai, Dongwoon et al., LTE-Advanced Modern Design: Challenges and Perspectives, Copyright 2012 IEEE, IEEE Communications Magazine, Feb. 2012, pp. 178-186.
El-Khamy, Mostafa et al., Soft Turbo HARQ Combining, Copyright 2013 IEEE, IEEE ICC 2013—Wireless Communication Symposium, pp. 5608-5613.
Odendahl, Maximilian et al., Optimized Buffer Allocation in Multicore Platforms, Copyright 2014 EDAA, pp. 6.
Takeda, Kazuaki et al., Effects of Wideband Scheduling and Radio Resource Assignment in OFDMA Radio Access for LTE-Advanced Downlink, Copyright 2009 IEEE, pp. 5.
Takeda, Kazuaki et al., Investigation on Rate Matching and Soft Buffer Splitting for LTE-Advanced Carrier Aggregation, Copyright 2012 IEEE, pp. 5.
Torrea-Duran, Rodolfo et al., Reduction of HARQ memory in low mobility LTE systems, Copyright 2013 IEEE, pp. 5068-5072.
Toumpakaris, Dimitris et al., Storage-Performance Tradeoff for Receivers of MIMO Systems using Hybrid ARQ, Copyright 2008 IEEE, pp. 381-385.
3GPP TSG-RAN WG1 Meeting #77, Seoul, Korea, May 19-23, 2014, Clarification on determination on soft buffer size, pp. 3.
3GPP TSG RAN WG1 Meeting #65, Barcelona, Spain, May 8-13, 2011, Soft buffer handling for Rel-10 UEs, pp. 9.
3GPP TSG-RAN1#65, Barcelona, Spain, May 9-13, 2011, Ambiguity of soft buffer size and UE capability for Rel-10 UEs, pp. 3.
3GPP TSG RAN WG1 Meeting #65, Barcelona, Spain, May 9-13, 2011, Further evaluation of soft buffer partitioning for CA, pp. 10.
3GPP TSG RAN WG1 Meeting #65, Spain, Barcelona, May 9-13, 2011, Soft Buffer Partitioning, pp. 4.
3GPP TSG-RAN WG1 #65, May 9-13, 2011, Barcelona, Spain, Soft buffer partitioning for CA, pp. 13.
3GPP TSG-RAN WG1 Meeting #65, Barcelona, Spain, May 9-13, 2011, Soft buffer partitioning in carrier aggregation, pp. 3.
3GPP TSG RAN WG1 meeting #65, Barcelona, Spain, 9-13, 2011, Soft buffer partitioning for Rel-10, pp. 3.
3GPP TSG-RAN Meeting #65, Barcelona, Spain, May 9-13, 2011, Rate matching parameters for CA, pp. 3.
3GPP TSG-RAN Meeting #65, Barcelona, Spain, May 9-13, 2011, UE behaviour for PDSCH reception with limited soft buffer in CA, pp. 3.
3GPP TSG RAN WG1 Meeting #65, Barcelona, Spain, May 9-13, 2011, LS on DL-SCH soft buffer partitioning and rate matching for Rel-10 carrier aggregation, pp. 2.
Peng He-Ping et al., "Design of a High-Efficiency Controller for an Embedded Microprocessor", China Academic Journal Electronic Publishing House, Apr. 23, 2006, 3 pages.
Chinese Office Action dated Jul. 15, 2020 issued in counterpart application No. 201610086124.5, 6 pages.

* cited by examiner

METHOD AND SYSTEM FOR CONTIGUOUS HARQ MEMORY MANAGEMENT WITH MEMORY SPLITTING

PRIORITY

The present application claims priority under 35 U.S.C. § 119(e) to United States Provisional Application No. 62/116,094, entitled "Method and System for Contiguous HARQ Memory Management," which was filed on Feb. 13, 2015, the contents of which are incorporated herein by reference.

BACKGROUND

1. Field of the Disclosure

The present disclosure relates generally to semi-static memory partitioning and efficient memory management of on-chip and off-chip memories and, more specifically, to downlink Hybrid Automatic Repeat reQuest (HARQ) buffer memory management for User Equipment (UE) in a Long Term Evolution (LTE) system using Carrier Aggregation (CA).

2. Description of the Related Art

In a HARQ system, the receiver of a packet performs error detection on that packet and informs the sender of the results. More specifically, the receiver sends an ACK if no errors are detected and a NACK if errors are detected. If the sender receives a NACK, the sender retransmits the same packet to the receiver. Using a technique called "soft combining," the receiver combines the re-transmitted packet with the originally transmitted packet in order to determine the correct contents of the packet. However, this requires the receiver to store a received packet until after error detection is performed and, if an error is detected, until a retransmitted packet is received. This storage is called a HARQ buffer, HARQ memory, or a soft buffer.

Ever-increasing data speeds and/or throughput have meant that HARQ buffers in UEs have had to be able to store ever-increasing amounts of data. In LTE, various categories for the capabilities of an UE have been defined. In categories 5, 6, and 7, the UE must be able to store about 3.7 million soft bits for the downlink (DL) HARQ buffer. Category 14 in LTE-Advanced requires about 47.4 million soft bits. Normally, the HARQ buffer for a UE (e.g., a mobile terminal) is implemented "on-chip," i.e., as memory in the RF/baseband modem chip or System on Chip (SoC); however, such large HARQ buffer sizes would be difficult to keep on-chip. One solution is to keep some of the HARQ buffer off-chip, i.e., in an external memory. However, this leads to problems of data availability, as accessing external memory takes considerably longer than accessing data stored on-chip.

At present, HARQ buffer memory requirements are effectively reduced by compressing the soft bits before they are stored. The quantized soft bits are the result of channel estimation of the received downlink signal, and are in the form of Log Likelihood Ratios (LLRs), which means that one soft bit can be accurately represented by eight (8) bits, although many implementations use 4 or 5 bits. Compression can reduce those 4-8 soft bits to as little as a single bit; however, the cost of compression is the loss of accuracy and fidelity of the original LLR value.

Memory allocation of a UE DL HARQ buffer can be complex and somewhat unpredictable. In LTE-Advanced, a UE may receive up to five component carriers (CCs) and further specifications will allow carrier aggregation up to 32 CCs, the bandwidths of each of which can range in size from 1.4 to 20 MHz, and each of which may have up to sixteen parallel HARQ processes. The HARQ processes are performed in parallel in order to maximize throughput: if one HARQ process stops and waits for a re-transmitted packet, the other HARQ processes can continue. Further complicating UE DL HARQ buffer memory allocation is the fact that the sizes of HARQ processes can be different. Further still, the HARQ processes and CCs are continually activating and deactivating, thereby continually changing storage requirements.

Some UE DL HARQ buffer memory allocation systems deal with this continually changing complexity by dynamically allocating (and de/re-allocating) memory as the changes occur. In other words, when a new HARQ process is activated, the appropriate amount of memory in the HARQ buffer is allocated, and when a HARQ process is deactivated, its allocated memory is "de-allocated" (i.e., the system considers it "empty" and ready to be allocated). Over time, as CCs with varying numbers of HARQ processes activate and deactivate, and the HARQ processes (of varying sizes) within each CC activate and deactivate (and "stop" for re-transmission), just keeping track of what is allocated and at what location becomes increasingly complex. Furthermore, such HARQ buffers are often completely reallocated for each received subframe.

Such dynamic HARQ buffer systems typically use complex linked list memory management schemes to continually reallocate and repartition HARQ memory. Besides the resources required to maintain a linked list memory management system, a HARQ buffer maintained by such a system will inevitably have memory fragmentation, which could become quite severe, and, even when not severe, slows down the movement of data, possibly causing HARQ process "drops" (i.e., when, because data is not where it is supposed to be when it is supposed to be, the HARQ process stalls).

The data in a HARQ process is segmented into transport blocks, which are, in turn, segmented into code blocks. Another level of complexity is added for the UE DL HARQ buffer by the fact that, unlike the UL, the DL is asynchronous, which means the UE DL HARQ buffer does not "know" when the next transport block of a particular HARQ process is going to arrive. This becomes problematic when, for example, a re-transmitted transport block needs to be combined with the previously transmitted transport block because both transport blocks should be immediately available to the combiner at the same time.

When a system in which the HARQ buffer is partially stored off-chip uses typical linked list memory management, each new process is allocated when it arrives, and is stored either on-chip or off-chip. When combined with the asynchronous nature of the DL HARQ processes, HARQ processes will slow down and possibly drop because of the extra time required to access a previously-transmitted transport block (with a detected error) stored in external memory when it is needed for combining with a received re-transmitted transport block.

Thus, there is a need for apparatuses, systems, and methods for effective and efficient UE DL HARQ buffer memory management.

SUMMARY

Accordingly, the present disclosure has been made to address at least the problems and/or disadvantages described above and to provide at least the advantages described below. In one aspect of the present disclosure, a more efficient memory management scheme is provided for a UE DL HARQ buffer, which is free from memory fragmentation, and does not require memory repartitioning every subframe. In another aspect of the present disclosure, the HARQ buffer may use multiple different compression and/or transformation modes to maximize HARQ buffer usage and HARQ combining efficiency. In yet another aspect of the present disclosure, the HARQ buffer is pre-partitioned to optimize contiguous memory allocation and maximize efficiency and usage of the HARQ buffer and the HARQ combiner.

In still another aspect of the present disclosure, the HARQ buffer memory is split between off-chip (external) and on-chip (internal) memories, while meeting timing constraints and HARQ retransmission constraints. In yet another aspect of the present disclosure, a portion of the HARQ buffer is stored in external memory, while making what is stored in external memory available when needed, thereby meeting standard requirements of asynchronous DL HARQ transmissions while maximizing performance and minimizing power usage by adapting the storage compressions/transformations and minimizing writes to external memory.

In accordance with an aspect of the present disclosure, a user equipment (UE) is provided, including a modem chip which includes a downlink (DL) Hybrid Automatic Repeat reQuest (HARQ) buffer controller which, when at least one of a number of active component carriers (CCs) allocated to the UE changes, a number and/or size of HARQ processes changes, a transmission mode changes, and HARQ processing is initiated, performs pre-partitioning by: setting a number of partitions equal to the number of active CCs; setting relative sizes of the partitions to be proportional to the capacity of their corresponding CCs; selecting optimum compression levels and number of HARQ processes for each partition using one or more criteria; and allocating the entire HARQ buffer memory with the set number of HARQ buffer partitions having the set relative sizes, where each partition has a number of sub-partitions equal to the selected optimum number of HARQ processes for that partition.

In accordance with another aspect of the present disclosure, a method of allocating a user equipment (UE) downlink (DL) Hybrid Automatic Repeat reQuest (HARQ) buffer is provided, including pre-partitioning the HARQ buffer by setting a number of partitions equal to a number of active component carriers (CCs); setting relative sizes of the partitions to be proportional to the capacity of their corresponding CCs; selecting optimum compression levels and number of HARQ processes for each partition using one or more criteria; and allocating the entire HARQ buffer memory with the set number of HARQ buffer partitions having the set relative sizes, where each partition has a number of sub-partitions equal to the selected optimum number of HARQ processes for that partition, wherein pre-partitioning is performed when at least one of the number of active CCs changes, the number and/or size of HARQ processes changes, the transmission mode changes, and HARQ processing is initiated.

In accordance with yet another aspect of the present disclosure, a method of allocating a user equipment (UE) downlink (DL) Hybrid Automatic Repeat reQuest (HARQ) buffer is provided, including determining an optimum ratio of internal memory available for the HARQ buffer to external memory available for the HARQ buffer; and allocating each partition and sub-partition of the logical HARQ buffer memory between the internal memory and the external memory in accordance with the determined optimum ratio.

In accordance with still another aspect of the present disclosure, a modem chip is provided for a user equipment (UE), including a downlink (DL) Hybrid Automatic Repeat reQuest (HARQ) buffer controller which, when at least one of a number of active component carriers (CCs) allocated to the UE changes, a number and/or size of HARQ processes changes, a transmission mode changes, and HARQ processing is initiated, performs pre-partitioning by: setting a number of partitions equal to the number of active CCs; setting relative sizes of the partitions to be proportional to the capacity of their corresponding CCs; selecting optimum compression levels and number of HARQ processes for each partition using one or more criteria; and allocating the entire HARQ buffer memory with the set number of HARQ buffer partitions having the set relative sizes, where each partition has a number of sub-partitions equal to the selected optimum number of HARQ processes for that partition.

In accordance with yet still another aspect of the present disclosure, a modem chip is provided for a user equipment (UE), including a connection to a bus; internal memory; and a downlink (DL) Hybrid Automatic Repeat reQuest (HARQ) buffer controller which determines an optimum ratio of the internal memory available for the DL HARQ buffer to external memory available over the bus via the connection for the DL HARQ buffer and allocates each partition and sub-partition of the logical DL HARQ buffer memory between the internal memory and the external memory in accordance with the determined optimum ratio.

The present disclosure provides apparatuses (including, but not limited to, UEs and modem chips for UEs), systems, and methods for effective and efficient UE DL HARQ buffer memory management by pre-partitioning the entire UE DL HARQ buffer memory space according to the number and capacities of the active carrier components and/or by splitting the UE DL HARQ buffer between on-chip and off-chip memory by an optimum ratio, where each partition and sub-partition is allocated between the on-chip and off-chip memories in accordance with the optimum ratio.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
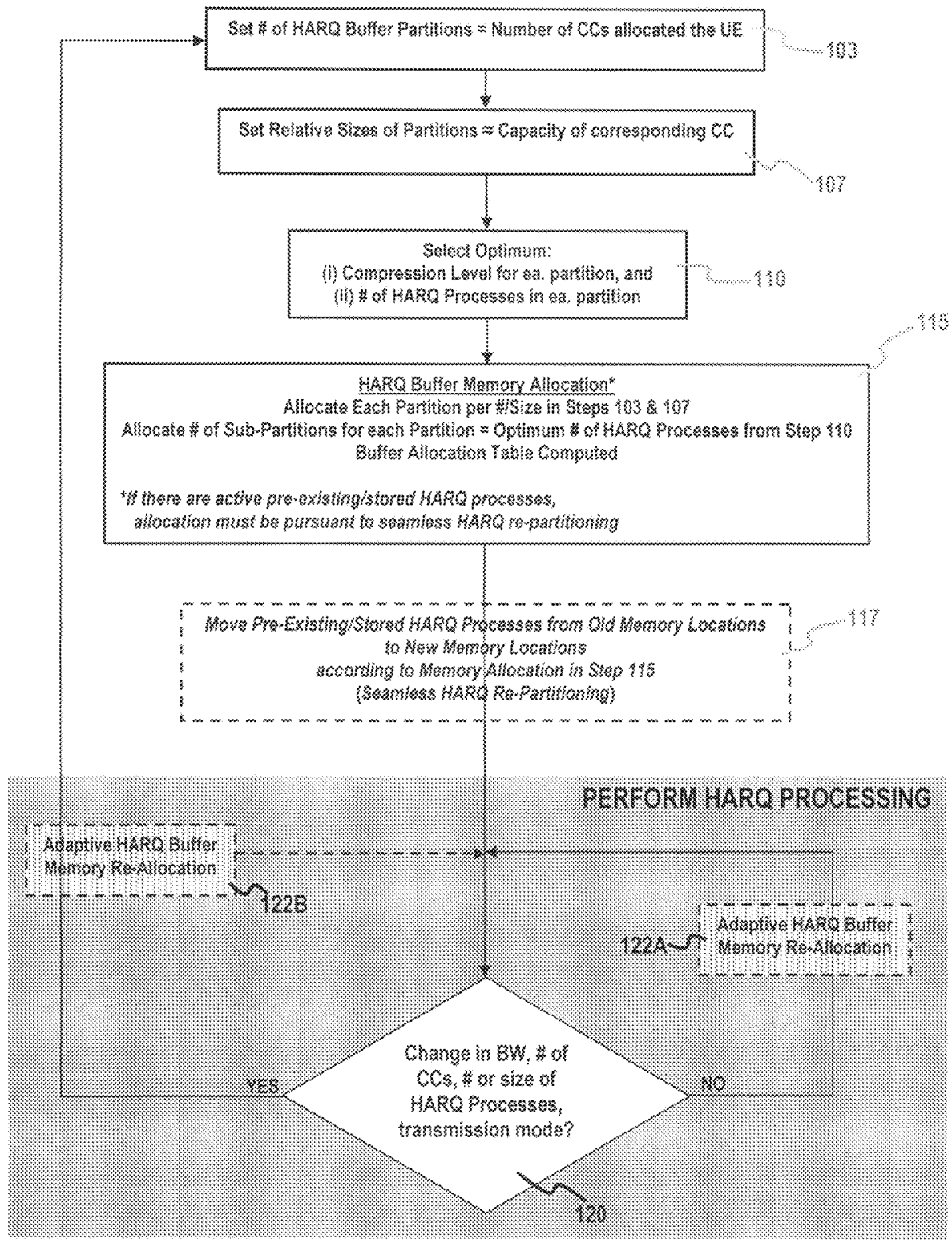
FIG. 1A is a flowchart of a method of initial contiguous HARQ memory allocation according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Contiguous HARQ memory allocation according to embodiments of the present disclosure pre-partitions the UE DL HARQ buffer according to the capacities of the active DL carrier components. Optimization is then performed in order to select compression levels for each partition and the sizes and numbers of sub-partitions within each partition. The entire HARQ buffer memory is allocated. HARQ processing using that memory allocation continues until there is a change in transmission mode and/or the number and/or bandwidth of active component carriers, at which point, contiguous HARQ memory allocation is performed again. If contiguous HARQ memory allocation is performed when there is active data (e.g., transport blocks of an active HARQ process) stored in the HARQ buffer, seamless HARQ re-partitioning is performed to guarantee there is no loss of data.

HARQ memory splitting according to embodiments of the present disclosure provides methods, systems, and apparatuses which effectively and efficiently allocate a UE DL HARQ buffer between both on-chip and off-chip memory. Rather than allocating HARQ processes either on-chip or off-chip, HARQ memory splitting according to embodiments of the present disclosure split each HARQ process (or each transport block of each HARQ process) between on-chip and off-chip memory. To prevent HARQ process drops, a scratch buffer is provided on-chip.

Some of the advantages resulting from aspects presented in the present disclosure include:
  Smaller chip area required for UE DL HARQ buffer
  Less power consumption by UE DL HARQ buffer operations
  Less prone to HARQ process drop due to memory fragmentation
  Offload HARQ memory to external buffer while still meeting the requirements of asynchronous HARQ reception
  Higher data throughput achieved by more efficient HARQ memory management and storage of more processes through adaptation of HARQ memory
  Avoid complex linked list memory managements required to dynamically reallocate and repartition HARQ memory according to newly received processes
  Avoid dropping HARQ combining resulting from lack of knowledge of next received process due to asynchronous nature of HARQ processes Contiguous HARQ memory allocation and HARQ memory splitting according to embodiments of the present invention can be implemented together or separately. For convenience of description/explanation, contiguous HARQ memory allocation is described separately first below, then HARQ memory splitting, and lastly a method employing both is described.

I. Contiguous HARQ Memory Allocation

As discussed above, a UE may be allocated multiple component carriers (CCs), where each of those multiple CCs may have different numbers of parallel HARQ processes, and each of those HARQ processes may have a different size. Conventional HARQ buffer memory allocation systems, when a new HARQ process is received, search for empty locations in the HARQ buffer to assign to the newly received process, leading to memory fragmentation, unutilized memory, and general inefficiency.

In embodiments according to the present disclosure, the entire HARQ buffer is pre-partitioned. The number of logical HARQ buffer partitions is set to be equal to the number of CCs allocated to the UE. The relative sizes of each partition are initially set based on the capacity of its corresponding CC—e.g., on the number of possible parallel HARQ processes on that CC, the bandwidth allocated to that CC, the number of transport blocks (TB) transmitted per HARQ process, the transmission mode (or, more exactly, possible sizes and numbers because of the transmission mode), etc. In one embodiment, the size of each partition is set to be proportional to the size required to store the minimum number of HARQ processes for its corresponding CC, as required by the standard for each transmission mode, where each of those HARQ processes have the maximum possible transport block allocation as determined by the maximum bandwidth allocation and transmission mode. The actual transport block allocation will depend on multiple factors, which may include the channel quality of the receiving device and the fraction of bandwidth allocated to that device as determined by the multiuser scheduler. In another embodiment, the number and size of logical HARQ partitions are initially set according to the maximum number of HARQ processes allowed at the operating transmission mode and the maximum size of each HARQ process.

Then, overall HARQ buffer optimization is performed, resulting in at least the selection of compression levels and number of sub-partitions for each partition. Depending on the embodiment, the number/size of logical HARQ partitions/sub-partitions and/or the compression/transformation scheme for each, some, or all logical HARQ partitions/sub-partitions may be modified to optimize resource usage and/or consumption. In any event, after pre-partitioning, the aggregated size of all of the partitions equals the size of the total memory available for the HARQ buffer and the aggregated size of all of the sub-partitions in each partition equals the total memory of that partition—i.e., the HARQ buffer is completely allocated upon initiation. Once all of this is done, the memory is actually allocated by computing a buffer allocation table.

In one embodiment, the overall HARQ buffer optimization jointly optimizes the compression levels for each of the CCs (partitions) and the number of HARQ processes to be stored for each CC (i.e., the number of sub-partitions for each partition), while also maximizing buffer occupancy (i.e., filling each partition) and guaranteeing the minimum number of HARQ processes for each CC. The compression level and number of HARQ processes (sub-partitions) would be selected for each partition/CC based on which provided the largest aggregate number of HARQ processes stored in the HARQ buffer, with the constraint of maximizing the utilization of the HARQ buffer and having the least unutilized memory. In another embodiment, the number of sub-partitions equals the number of HARQ processes of the CC that can be stored simultaneously.

FIG. 1A is a flowchart of a method of initial contiguous HARQ memory allocation according to an embodiment of the present invention. In step 103, the number of HARQ buffer partitions is set to the number of CCs allocated to the UE. In step 107, the initial size of each partition is set to be proportional to the size required to store the minimum required number of HARQ processes for the corresponding CC, where each HARQ process has the maximum possible allocation of transport blocks (TBs). The maximum number of TBs is dependent on the carrier bandwidth.

In step 110, the optimum (i) compression level for each partition/CC and (ii) number of HARQ processes stored in each partition/CC are selected. In this embodiment, the compressions levels and numbers of HARQ processes of each partition/CC are jointly optimized to maximize the total number of HARQ processes to be stored per partition/CC and HARQ buffer occupancy. Of course, the minimum required number of stored processes per carrier is also guaranteed. If two different combinations of compression levels and numbers of HARQ processes per partition/CC result in the same (and greatest) aggregated number of HARQ processes, the combination with the largest HARQ buffer occupancy and greater allocation to primary carriers is selected.

Figure 1B:
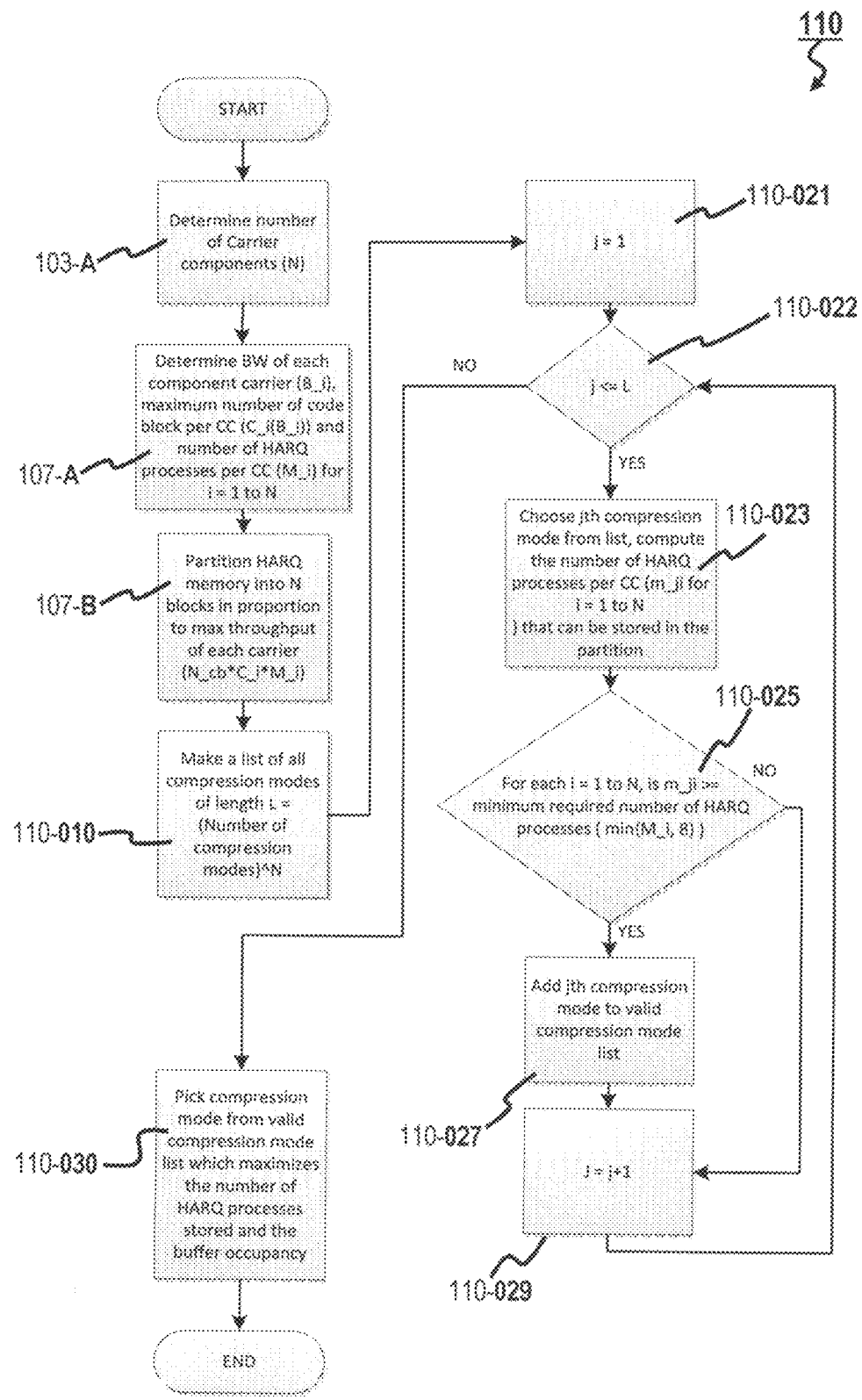
FIG. 1B is a flowchart of one possible method of global HARQ memory optimization to be performed in steps 103/107/110 of FIG. 1A according to an embodiment of the present disclosure.

FIG. 1B, described further below, is a flowchart of a method of global optimization which may be performed as steps 103/107/110 of FIG. 1A, according to an embodiment of the present disclosure.

In step 115, memory allocation of the HARQ buffer is performed, based on the previous calculations. The number of partitions calculated in step 103 are allocated, where each partition has the size calculated in step 107. Each partition is allocated the optimum number of HARQ processes calculated in step 110. In this embodiment, each partition is evenly divided by its determined optimum number of HARQ processes, so all of its sub-partitions are of the same size. In other embodiments, the sizes may vary within a partition, and may possibly be selected as part of optimization.

As indicated in FIG. 1A, if HARQ buffer memory allocation occurs during HARQ processing (i.e., is actually a re-allocation due to, e.g., activation or deactivation of component carriers), seamless HARQ re-partitioning or re-allocating is performed, both in step 115 and step 117. Because the presently-allocated HARQ buffer likely has transport blocks of "live" HARQ processes which must be retained, the new allocation in step 115 must take this into account. With seamless HARQ re-allocating, the new memory map according to the new allocation in step 115 is designed so that the "live" HARQ processes can be moved first to their new locations. This requires that the old and new memory locations do not overlap, as discussed in further detail in reference to step 117 below. Finally in step 115, the buffer allocation table is computed.

Step 117 is shown as a dotted box to indicate that it is only performed if active CCs already have partitions with 'live' data when steps 103-107-110-115 are performed (which will be the case most of the time). As mentioned above, in accordance with embodiments of the present disclosure, seamless HARQ buffer re-allocation (or re-partitioning) is performed in steps 115 and 117 to preserve the 'live' data in existing "old" partitions. In step 117, the old HARQ processes are read out of the HARQ buffer, modified if the new HARQ memory allocation requires it (e.g., if their compression has changed), and saved to their newly assigned memory locations first (i.e., before any new HARQ processes are saved). Accordingly, step 117 is shown happening before regular HARQ processing continues (as represented by the grey box in FIG. 1A). When regular HARQ processing continues, after step 117, new HARQ processes, etc., are saved and the old partitions/memory locations will be re-allocated/re-partitioned according to the new HARQ buffer memory allocation scheme. In other words, the old memory locations are effectively erased and replaced by the new HARQ buffer memory allocation scheme, but only after the 'live' contents of those old locations are stored in their new locations according to the new HARQ buffer memory allocation scheme. Although the term "continues" is used herein, it should not be interpreted to mean HARQ processing necessarily "stops" while steps 103-107-110-115-(117) are performed, but rather many of these operations and steps may be performed in parallel or otherwise implemented to allow continuous processing, as would be understood by one of ordinary skill in the art Once the UE DL HARQ buffer memory is allocated in step 115 (and step 117, if necessary, is performed), the UE performs HARQ processing of incoming TBs, which are compressed in accordance with the optimum levels selected for each CC in step 110. The initial contiguous HARQ memory allocation determined in steps 103-107-110-115 of FIG. 1A remains in place as long as there is no change in the bandwidth allocated to the UE, the number of CCs allocated to the UE, the number or maximum size of the HARQ processes—any of which could change due to, for example, change in transmission mode, carrier activation/de-activation, and/or bandwidth re-allocation.

As shown by decision diamond 120 in FIG. 1A, if there is a change in the bandwidth allocated to the UE, the number of CCs allocated to the UE, the number or maximum size of the HARQ processes, etc., steps 103-107-110-115, the initiation and allocation of the HARQ memory buffer, are performed again.

In other embodiments of the present disclosure, various modifications, as shown by optional steps 122A and 122B in FIG. 1A, can make the HARQ buffer memory allocation adaptive during HARQ processing without requiring the complete re-initiation/re-allocation of steps 103-107-110-115-(117).

Optional step 122A is performed during normal HARQ processing, as shown by its location on the NO loop from decision diamond 120 (i.e., there has been no change in bandwidth, number of CC's, etc.). Optional step 122A comprises, in one embodiment, performing the following for each received subframe: if the scheduled TB is smaller than the maximum size of its HARQ process (i.e., the size of its sub-partition), its assigned compression transformation can be changed so that the TB will fully occupy its sub-partition. In this manner, the HARQ process is stored with more fidelity and combining gain improvements will be observed.

Optional step 122B is performed when there has been a change in bandwidth, number of CC's, number or maximum size of HARQ processes, etc, as shown by its location on the YES loop from decision diamond 120. In one embodiment, optional step 122B is performed when the number of HARQ processes in a CC exceeds the number of sub-partitions allocated to that CC. In this embodiment, for each subframe, for each carrier, and for each TB corresponding to a process of that CC, if the decoding result and the error detection result indicates that the TB is received correctly, the memory sub-partition corresponding to that TB is labelled as available. Then each received process within that carrier that does not have an allocated sub-partition in the HARQ buffer is assigned to one of the available memory sub-partitions (which, of course, is then labelled occupied), without changing any sub-partition sizes. If a TB that is not associated with a sub-partition is received and no available sub-partition exists, the received TB is decoded and checked for errors, but not saved for later possible combining. In another embodiment, when the number of HARQ processes in a CC exceeds the number of sub-partitions allocated to that CC in its partition, the compression levels for the existing sub-partitions are increased, thereby creating enough room for another sub-partition in that partition. In such an embodiment, the partitions would stay in place while the number of sub-partitions in each may vary over time without requiring a complete re-allocation, i.e., without repeating steps 103-107-110-115-(117).

FIG. 1B is a flowchart of one possible implementation of steps 103/107/110 in FIG. 1A. More specifically, FIG. 1B is a flowchart of a method of global HARQ memory optimization according to an embodiment of the present disclosure.

In step 103-A of FIG. 1B, the number (N) of carrier components is determined. In step 107-A, the bandwidth (BW) of each CC (B_i), the maximum number of code blocks per CC(C_i), and the number of HARQ processes per CC (M_i) are determined. In step 107-B, the HARQ buffer is initialized as N partitions, where the size of each partition is proportional to the relative maximum bandwidth of its corresponding CC (N_cb*C_i*M_i), where N_cb is the number of bits to be stored per code block. In step 110-010, a list of all compression modes of length L=(Number of compression modes)$^N$ is made.

In steps 110-022/110-023/110-025/110-027/110-029, the method loops through all possible compression modes in order to make a list of all valid possible compression modes pursuant to the set constraints. In step 110-021, the index j is set to 1 to initialize the process. Next, in step 110-022, it is determined whether j is less than or equal to L, which is the length of all of the compression modes (see step 110-010). In step 110-023, the jth compression mode from the list of compression modes made in step 110-010 is chosen to compute the number of HARQ processes (m_ji) that can be stored in CC/partition i at the jth compression level (for CC/partitions i=1 to N).

In step 110-025, it is determined whether the number of HARQ processes (m_ji) that can be stored in CC/partition i at the jth compression level computed in step 110-023 is greater than or equal to the required minimum number of HARQ processes for CC/partition i, which is the minimum of M_i and 8 (i.e., min{M_i,8}). This is performed for each CC/partition i, i.e., i=1 to N. If the computed number of HARQ processes (m_ji) is greater than or equal to the required minimum number of HARQ processes for CC/partition i in step 110-025, the jth compression mode is valid and, accordingly, it is added to the valid compression list in step 110-027. After step 110-027, or if the computed number of HARQ processes (m_ji) is less than the required minimum number of HARQ processes for CC/partition i in step 110-025, the index j is incremented by 1 in step 110-029 and the method returns to step 110-022. By these means the loop of steps 110-022/110-023/110-025/110-027/110-029 keeps repeating until j is greater than L, the length of all of the compression modes, in step 110-022.

When that process stops, i.e., when the index j becomes greater than L in step 110-022, the compression mode from the valid compression mode list which maximizes the number of stored HARQ processes and the HARQ buffer occupancy is selected in step 110-030.

In the embodiment discussed in reference to FIG. 1B, there is a global optimization of HARQ memory partitioning to maximize the HARQ memory utilization and maximize the HARQ combining efficiency. The global optimization is done by finding the combination of compression levels across all partitions that will maximize the number of HARQ processes that are stored in the HARQ buffer. However, such global optimization results in favoring CCs that have more possible HARQ processes or received bits per subframe at the expense of CCs which have less possible HARQ processes or received bits per subframe, because these CCs will be assigned smaller partitions and/or higher compression levels, resulting in less HARQ combining efficiency for these CCs. Another embodiment according to the present disclosure allocates the partitions fairly among the CCs and locally optimizes the bit compression level to maximize the HARQ combining efficiency for each CC and to maximize the buffer utilization of its corresponding memory partition. In this embodiment, the optimization in step 110 comprises selecting the bit-compression transformation for each partition according to a global optimization procedure, a local optimization procedure, or a combination thereof. In case the buffer occupancy of this allocation after the optimization is less than 100% for a partition, then corresponding unused memory of that partition is allocated (carried-over) to another carrier which has dropped HARQ processes, without changing compression mode of first partition. If there are no more dropped processes, aggregated left over memory can be logically reallocated and aggregated to another partition to improve the HARQ efficiency of its corresponding carrier.

As mentioned above, during HARQ processing, the number of HARQ processes of a CC can exceed the minimum required number of processes—i.e., can be greater than the minimum required to be stored by the UE according to the LTE-Advanced standard specification. In such cases, the device can choose not to allocate memory for the extra processes, although storing the extra processes will provide HARQ combining gain and hence higher data throughput and better performance. Alternatively, the HARQ controller may choose to store more HARQ processes by transforming the soft bit LLRs with more aggressive compression such that each sub-partition will require less memory. The disclosed scheme will jointly optimize the compression levels for each carrier, such that different CCs can use different compression levels.

II. HARQ Memory Splitting

When the HARQ memory is split into an on-chip (internal) memory and off-chip (external) memory, there are a number of challenges. One challenge is the strict timing of hardware due to the asynchronous nature of DL HARQ processes. Also, when a re-transmitted transport block is received, there is a limited time period to perform the HARQ combining operation on that process. Yet another challenge is that each HARQ process should be available internally before the HARQ combining operation. However, when some HARQ processes are stored in internal memory and other HARQ processes are stored in external memory (which requires, for example, read/writes over a bus), HARQ processes may not be immediately available when needed, resulting in a failure to meet the timing requirements or, at the least, in a loss of HARQ combining efficiency.

When splitting the HARQ buffer between on-chip and off-chip memory according to embodiments of the present disclosure, each HARQ process is split, i.e., part of the HARQ process is stored internally and part of the HARQ process is stored externally. In the embodiment discussed below, each transport block within a HARQ process is split between on-chip and off-chip memory. Although some embodiments discussed below have the UE DL HARQ buffer split between two memories (an on-chip memory and an off-chip memory), the present disclosure is equally applicable to situations involving multiple on-chip and/or off-chip memories. For example, in an embodiment which uses two external memories, the transport block could be split in three, where the external memory with the greatest latency would store the very end of the transport block so that those code blocks will have the most time to be transmitted to the HARQ combiner (i.e., while the first two portions of the transport block are being combined).

Figure 2A:
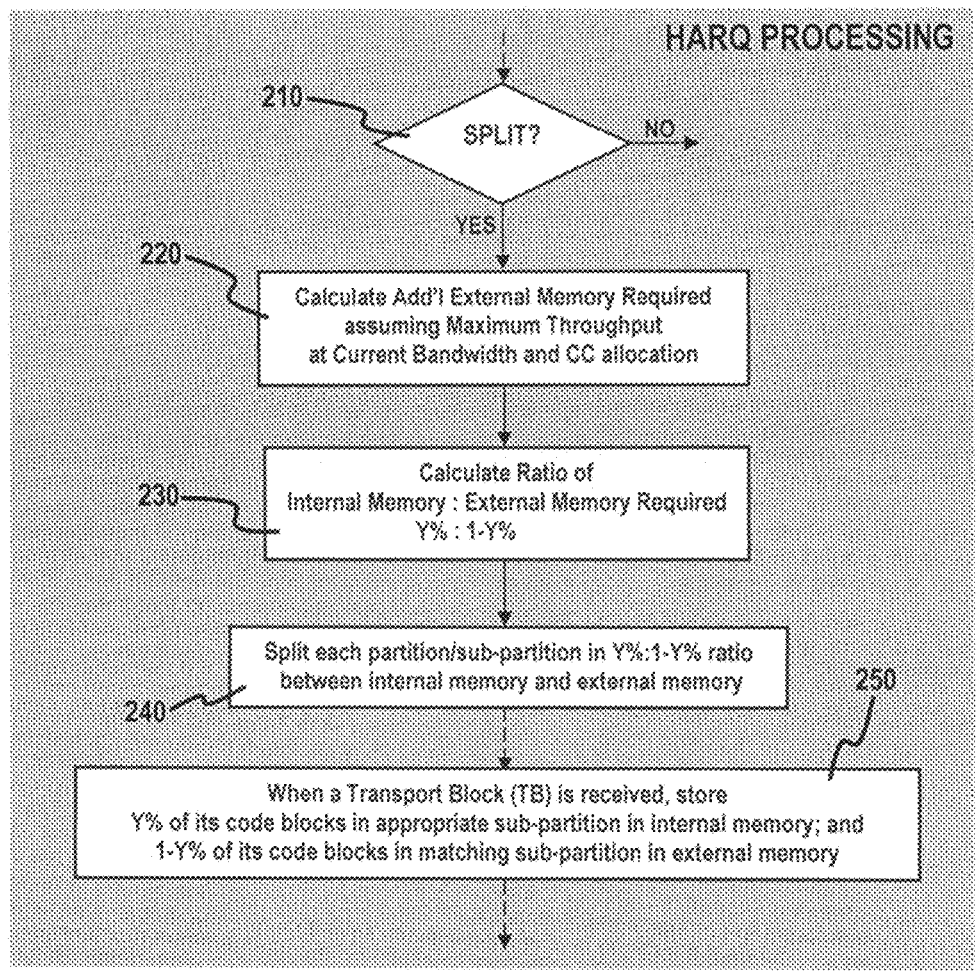
FIG. 2A is a flowchart of a method of HARQ buffer memory splitting according to an embodiment of the present disclosure.

FIG. 2A is a flowchart of a method of HARQ buffer memory splitting according to an embodiment of the present disclosure. In step 210, it is determined whether to split the HARQ buffer between the internal and external memory. This step may occur at practically any time and the determination may be based on any criteria. In one embodiment, step 210 may occur during initial HARQ buffer memory allocation and the determination may be based on whether the on-chip memory is large enough to fit the required HARQ processes. In other embodiments, this step may occur during regular HARQ processing and may be based on one or more of present operating conditions of the mobile device, present operating conditions of the overall system, a power/resource management scheme of the mobile device, etc. In other embodiments, the decision whether to split the HARQ buffer may depend on certain thresholds, such as the compression techniques that would be required to fit all of the HARQ processes (at maximum throughput) into the internal memory, the resulting overall number of sub-partitions, etc., and/or other heuristic models. In some embodiments, this step may occur whenever a HARQ process activates, deactivates, changes its memory requirements, etc. In yet other embodiments, the default setting for the device is to have HARQ buffer memory splitting, and thus there is no step 210, but there is another step in which it is determined whether to store a code block, transport block, HARQ process, CC/partition, and/or the entire HARQ buffer entirely on-chip.

In the embodiment shown in FIG. 2A, the steps occur during HARQ buffer memory allocation and step 210 depends on whether all of the HARQ processes can fit into the internal memory at the given carrier aggregation and bandwidth combination. If all of the HARQ processes can fit into the internal memory (NO in step 210), HARQ buffer memory allocation continues, using only the internal memory. If all of the HARQ processes cannot fit into the internal memory, splitting is determined to be required (YES in step 210), and the method continues at in step 220.

In step 220, the additional external memory required to fit all of the HARQ processes is calculated. This calculation is done assuming the maximum possible throughput at the current bandwidth and carrier aggregation allocation. In other embodiments, different assumptions may be used, the external memory capacity may be limited, the external memory may be a set value or adaptive, depending on, e.g., operating conditions, etc. Moreover, in other embodiments, the calculation in step 220 may be more complex, involving factors such as available external memory (assuming more than one external memory may be used and/or the memory is, e.g., dual use), available compression schemes, present operating conditions of the mobile device, present operating conditions of the overall system, a power/resource management scheme of the mobile device, etc. In most embodiments, the reason for the split in step 210 is directly related to whatever calculation/determination is made in step 220.

In step 230, the ratio of internal memory to required external memory is calculated. The ratio calculated here would depend on what exactly is calculated in step 220, which, as indicated above, may vary with the embodiments and/or implementation of the present disclosure. In other embodiments, the ratio may be predetermined, limited to a set of discrete values, limited to a range of values, etc. In some embodiments, the ratio would depend, at least partially, on one or more of the amount of available external memory (assuming more than one external memory may be used and/or the memory is, e.g., dual use), available compression schemes, present operating conditions of the mobile device, present operating conditions of the overall system, a power/resource management scheme of the mobile device, etc.

In step 240, the memory allocation is split according to the ratio calculated in step 230. Hence, the partitions and sub-partitions of the off-chip memory would have the same divisions and relative proportions as the partitions and sub-partitions of the on-chip memory, but different absolute sizes. If the calculated ratio is Y %:1-Y %, the size of the entire HARQ buffer on-chip would be in a Y %:1-Y % ratio to the size of the entire HARQ buffer stored off-chip, the size of each partition on-chip would be in a Y %:1-Y % ratio to the size of its corresponding partition off-chip, the size of each sub-partition on-chip would be in a Y %:1-Y % ratio to the size of its corresponding sub-partition off-chip, etc. In essence, it remains the same single memory allocation, split in two parts.

Figure 2B:
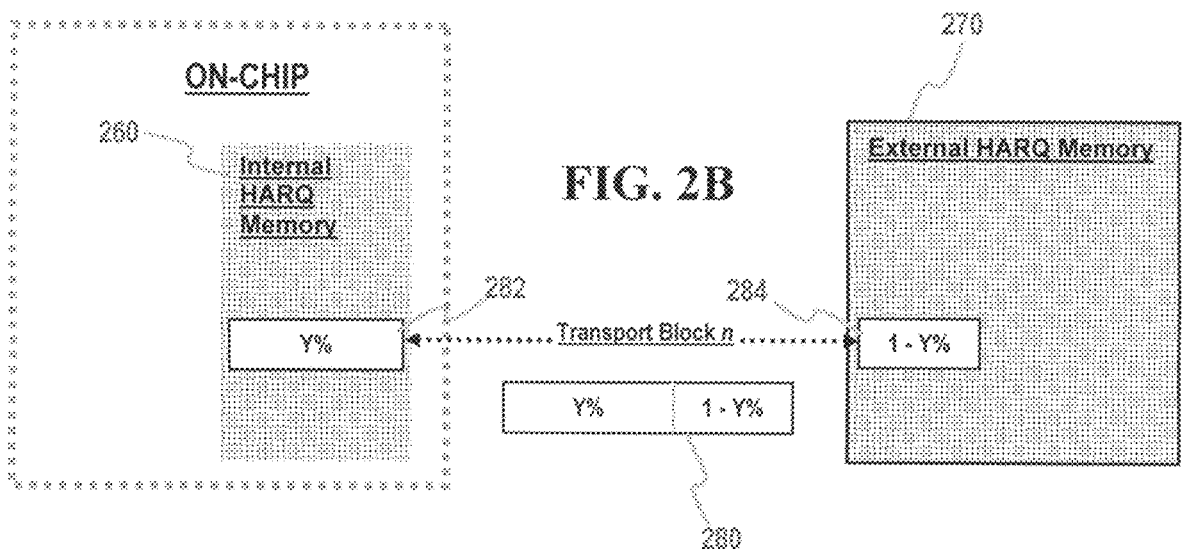
FIG. 2B is a graphic representation of a received transport block split between internal and external HARQ memory according to an embodiment of the present disclosure.

Step 250 of FIG. 2A occurs when a transport block is received during normal HARQ processing. Specifically, the transport block is split such that Y % of its code blocks are stored in the appropriate sub-partition in internal memory and the remaining 1-Y % code blocks are stored in the corresponding sub-partition in external memory. This is shown graphically in FIG. 2B, where transport block n 280 is being stored in a HARQ buffer which is split between internal HARQ memory 260 and external HARQ memory 270. Accordingly, the first portion 282, comprising Y % of transport block n 280, is stored in internal HARQ memory 260, while the remaining second portion 284, comprising 1-Y % of transport block n 280, is stored in external HARQ memory 270.

In the above step, if a transport block of a HARQ process constitutes C code blocks in the bandwidth combination achieving maximum throughput, then store Floor(Y %*C) code blocks in the internal memory, and store C−Floor(Y %*C) code blocks of that transport block in external memory, where Floor(x) represents the integer part of x.

During actual HARQ processing, the transport block size of each subframe may vary. In one HARQ splitting embodiment according to the present disclosure, if the size of a transport block in a received subframe is less than the total internal memory allocated for a transport block (i.e., less than Y % of the maximum size for that bandwidth combination), then the entire transport block can be stored in the internal memory, and external memory access will not be required when performing HARQ combining of that transport block.

If it is assumed that the total HARQ memory is split into 2 physical parts, where the internal memory is X % of the total HARQ memory and the external memory is (1-X) % of the total HARQ memory, then, according to embodiments of the present disclosure, up to (1-X) % of on-chip memory can be freed for other uses and/or eliminated. In the above embodiment, if the allocated throughput and HARQ memory allocation is at the maximum value, as determined by the maximum allowed throughput for the carrier and bandwidth allocation, then Y %=X %. However, if the allocated throughput, as determined by the base station based on parameters including the actual channel quality of the device and the multiuser scheduling constraints, is less than the maximum allowed throughput, then Y %>X %, and the device can store more HARQ processes in the internal memory.

In another embodiment of HARQ memory splitting, there are two modes: High Performance and Power Efficiency. In High Performance mode, the optimum compression levels are utilized for best performance, thereby using more external memory. In Power Efficiency mode, the compression levels are increased, so that a greater portion of each HARQ process can be stored on-chip, thereby storing more on-chip but with less fidelity to the original soft bits, and storing less off-chip, thereby reducing the number of times external memory is accessed, which will reduce power consumption.

In yet another embodiment, the device can choose to vary the storage split ratio between external and internal memories for each transport block, according to some design criterion, such as giving a higher priority to primary component carriers by giving them a larger storage split ratio. Such a variation in the storage split ratio across transport blocks can be done such as to maintain the average split ratio to be Y %, as explained in reference to step 250 of FIG. 2A above.

In another embodiment for HARQ memory splitting, when the HARQ splitting ratio does not result in an integer number of codeblocks, and thus there is fractional internal memory wasted/not occupied per transport block, the storage split ratio is varied per transport block, while keeping the average split ratio at Y %, by allowing some transport blocks to store one more codeblock internally than the rest of codeblocks. In the following, Nr is the total number of transport blocks stored in the HARQ buffer for a component carrier, where L are the number of transport blocks stored in external memory, $N_T - L$ are the number of transport blocks stored in internal memory, and C is the number of code blocks in a transport block. Let (1-Y %)C not be an integer, then the subpartitions allocated for each transport block will be adjusted such that $L = \lfloor N_T (\lceil (1-Y)C \rceil - (1-Y)C) \rfloor$ transport blocks will hold $\lfloor (1-Y)C \rfloor$ CBs externally and $N_T - L$ will hold ($\lceil (1-y)C \rceil$ CBs externally, where $\lceil x \rceil$ means the smallest integer larger than x, and $\lfloor x \rfloor$ means the floor of x, which is the largest integer smaller than x. This will result in a savings of $\lfloor N_T (\lceil (1-Y)C \rceil - (1-Y)C) \rfloor$ code blocks stored in external memory, which translates into savings of power consumption.

In another embodiment for HARQ memory splitting, if some internal partition is not fully occupied after storing full code blocks, and some code blocks of that transport block are stored in the external memory, then a code block can be further split into internal and external parts.

A. Scratch Buffer for HARQ Memory Splitting

In order to ensure proper timing and prevent HARQ combining drops, HARQ splitting according to embodiments of the present disclosure require a relatively small internal memory "scratch" buffer. The scratch buffer guarantees availability of information stored in the external memory at the appropriate time. The size of the scratch buffer is another optimization factor, as would be understood by one of ordinary skill in the art, depending on the particular embodiment and/or implementation. However, the size of the additional scratch buffer may, in many cases, be much smaller than the reduction in on-chip HARQ usage provided by the HARQ buffer splitting.

Figure 3:
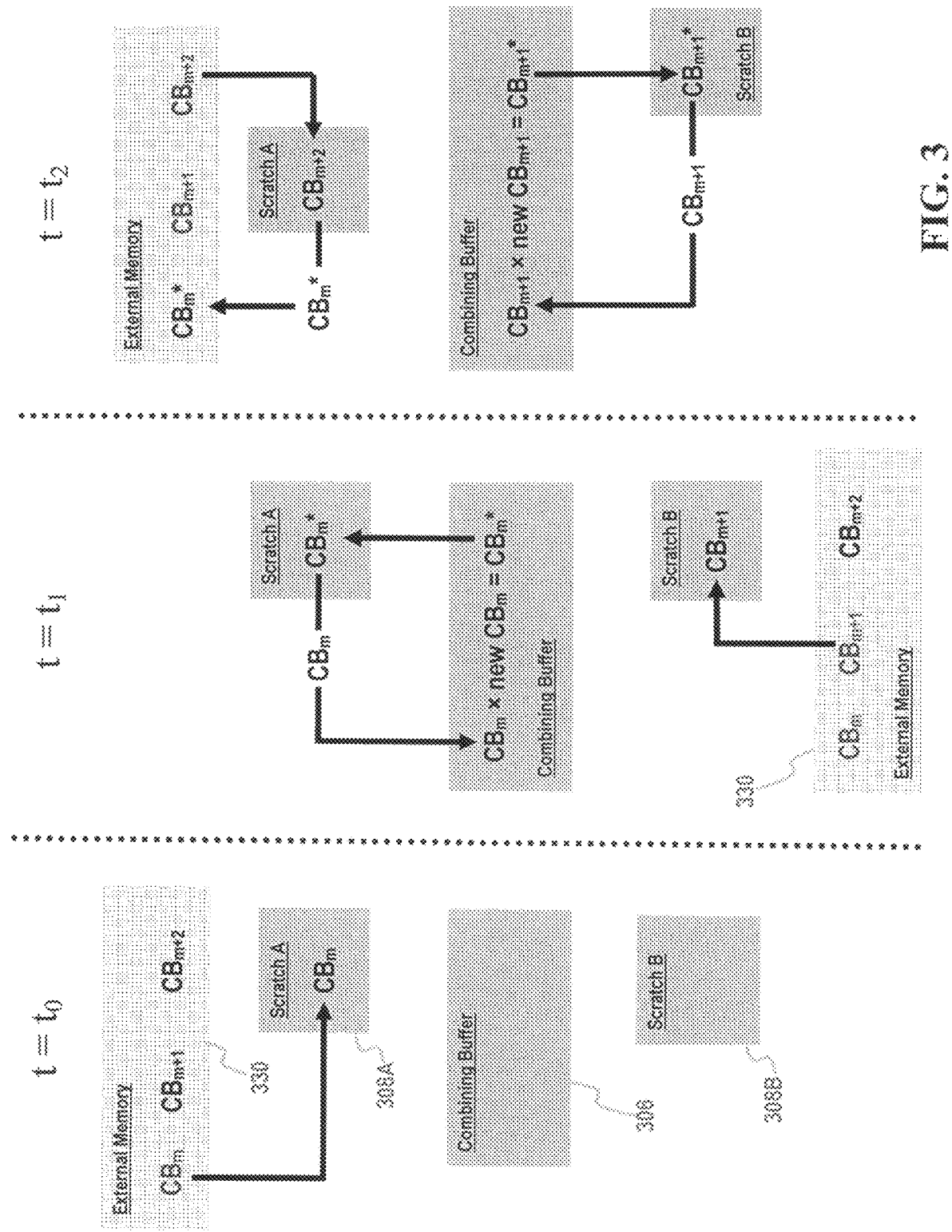
FIG. 3 is a schematic diagram showing the operations of a scratch buffer according to an embodiment of the present disclosure.

FIG. 3 is a schematic diagram showing the operations of a scratch buffer that can hold two code blocks according to an embodiment of the present disclosure. For convenience of description/explanation, the scratch buffer 308 will be referred to as two separate parts, "Scratch A" 308A and "Scratch B" 308B, each of which can hold a single code block. Although the scratch buffer of this embodiment holds two code blocks, this fairly minimal size is being used for convenience of description/explanation, and the present disclosure is not limited thereto, but may have much larger sizes, limited only by the particular needs and requirements of the implementation of the present disclosure, as would be understood by one of ordinary skill in the art.

In FIG. 3, a transport block has been retransmitted, and now the newly received transport block is being combined with the previously-stored transport block. More specifically, at time $t=t_0$, the code blocks of the transport block that were stored in internal memory have all been combined and saved, and now the first code block $CB_m$ of the code blocks of the transport block stored in the external memory needs to be combined with the corresponding $CB_m$ of the received re-transmitted transport block.

Accordingly, at time $t=t_0$ in FIG. 3, code block $CB_m$ is loaded into Scratch A 308A from the external memory 330. Although not shown in FIG. 3, the combining buffer 306 (which is on-chip) at $t=t_0$ may be combining and storing the last code block in internal memory. Reference numerals will not be repeated for the later time intervals in FIG. 3.

At time $t=t_1$, as shown on the upper portion of FIG. 3, $CB_m$ is loaded from Scratch A 308A into the combining buffer 306, combined with the corresponding $CB_m$ of the re-transmitted transport block ("new $CB_m$"), and the result ("$CB_m*$") is saved back to Scratch A 308A. At the same time, as shown in the lower portion of FIG. 3, the next code block $CB_{m+i}$ is loaded from external memory 330 into Scratch B 308B. Although there appears to be much more activity in the upper portion than the lower portion of $t=t_1$ in FIG. 3, they would take approximately the same time, because Scratch A 308A, Scratch B 308B, and the combining buffer 306 are located on-chip and can be accessed and data moved between them relatively quickly, while the external memory 330 is off-chip and thus a load (or 'write') from the external memory into the on-chip scratch buffer can take a relatively long time.

At time $t=t_2$, as shown on the upper portion of FIG. 3, combined code block $CB_m*$ is moved from Scratch A 308A to be stored in external memory 330, while the next code block $CB_{m+2}$ is loaded from external memory into Scratch A 308A. At the same time, as shown in the lower portion of FIG. 3, $CB_{m+1}$ is loaded from Scratch B 308B into the combining buffer 306, combined with the corresponding $CB_{m+1}$ of the re-transmitted transport block ("new $CB_{m+1}$"), and the result ("$CB_{m+1}$*") is saved back to Scratch B 308B.

Time $t=t_2$ in FIG. 3 shows what will be happening in every clock cycle: the contents of one scratch buffer will be combined while the contents of the other scratch buffer is stored and then loaded with the next code block. Thus, at time $t=t_3$, $CB_{m+2}$ will be combined with new $CB_{m+2}$ and the resulting $CB_{m+2}$* loaded back into Scratch A 308A, while $CB_{m+3}$ will be loaded into Scratch B 308B as $CB_{m+1}$* is loaded back into external memory 330. Indeed, although not shown in FIG. 3 for convenience of description/explanation, similar simultaneous operations may have also taken place at $t=t_0$ and $t=t_1$. As mentioned above, the combining buffer at $t=t_0$ may be combining the last code block $CB_{m-1}$ from internal memory, the result of which ($CB_{m-1}$*) would be stored back into internal memory. $CB_{m-1}$* would not be stored in the scratch buffer, because both combining buffer 306 and the internal memory are on-chip, which means $CB_{m-1}$* can be loaded relatively directly back into internal memory from combining buffer 306. Nonetheless, in an embodiment where storing $CB_{m-1}$* in Scratch B at $t=t_0$ was beneficial and/or necessary, it would have been moved to internal memory as $CB_{m+1}$ was loaded into Scratch B at time $t=t_1$. As shown by the example of FIG. 3, code blocks stored in the external memory can be made appropriately available when needed for combining (i.e., when there's a re-transmitted transport block) according to embodiments of the present disclosure.

For convenience of explanation/description, the total scratch buffer (Scratch A+Scratch B) in FIG. 3 comprises two code blocks, but the present disclosure is not limited thereto, and other embodiments may have scratch buffer sizes suitable for holding more or less code blocks. In some embodiments, the scratch buffer is implemented so as to allow for sufficient advance timing for utilization of soft buffer information. In other embodiments, the scratch buffer could be implemented so that code blocks from several different transport blocks could be accessed at the same time, which would be a beneficial for, e.g., parallel processing.

In one embodiment, the scratch buffer would act as the initial storage, and the external memory would only be used when re-transmission is necessary (i.e., when errors are detected). In such an embodiment, the code blocks of a transport block allocated to external memory would be initially stored in the scratch buffer. Error detection would be performed on the entire transport block (both the code blocks in internal memory and the code blocks in the scratch buffer). If no error is detected, there is no need to store the code blocks into external memory, thereby greatly reducing power and resource consumption. If an error is detected, the code blocks in the scratch buffer are loaded into external memory for later combining with the re-transmitted transport block. In other embodiments, the initial storage may be implemented off-chip but more easily accessible than the external memory.

In other embodiments, the scratch buffer and/or external memory may be used to store other data. For example, derivatives of the soft bits, such as hard-decision bits or decoding results, could be written to the scratch buffer or external memory to reduce power consumption or to improve performance.

Figure 4:
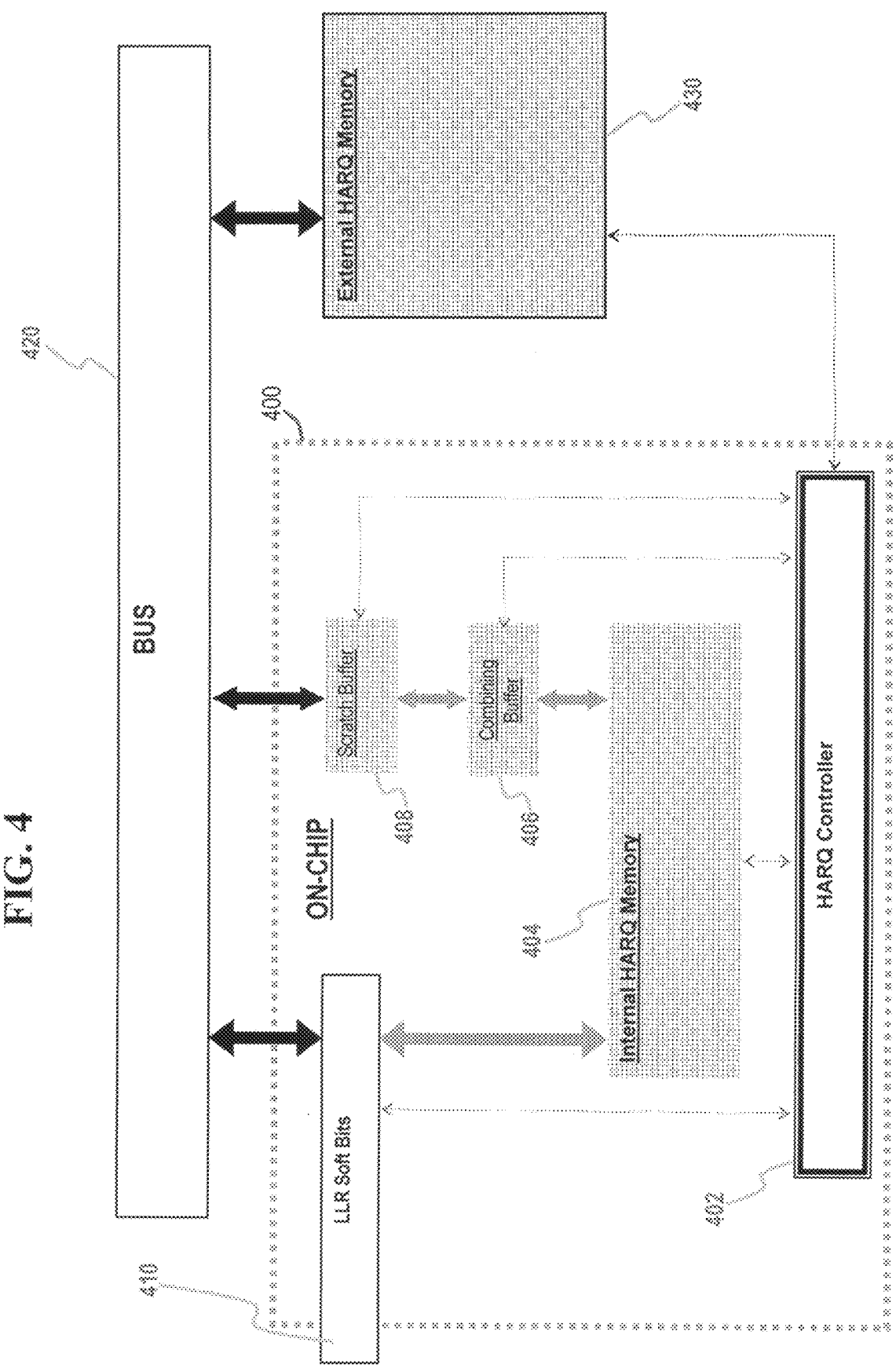
FIG. 4 is a block diagram of a HARQ memory apparatus with a scratch buffer according to an embodiment of the present disclosure.

FIG. 4 is a block diagram of a HARQ memory apparatus with a scratch buffer according to an embodiment of the present disclosure. FIG. 4 is greatly simplified and abstracted for convenience of explanation/description. Accordingly, the relative positions and sizes of the elements in FIG. 4 have no intrinsic and/or separate meaning. Only elements helpful for explanation/description are shown and, as would be known to one of ordinary skill in the art, many more components, connections, etc., would be needed to implement an embodiment of the present disclosure. Similarly, although components are shown separately, one or more may be combined in accordance with the present disclosure or, reversely, further separated into sub-components.

In FIG. 4, dotted box 400 indicates the elements that are on-chip, while elements outside dotted box 400 are off-chip. Thus, data bus 420 and external HARQ memory 430 are off-chip. LLR Soft Bits 410 represents the input for the HARQ buffer and is shown both on-chip and off-chip because the actual implementation of providing the soft bits to the appropriate components may take a large variety of forms. For example, one embodiment could have the transport/code blocks intended for the external memory routed directly to the external memory without necessarily going on-chip and/or have a specialized data path on-chip for speed and/or efficiency.

On-chip 400 in FIG. 4, HARQ controller 402 controls at least the HARQ memory operations pertinent to the present disclosure. Accordingly, HARQ controller 402 may control all on-chip HARQ functions in some embodiments. Although it would be possible to implement HARQ controller 402 as software, firmware, hardware, and/or any combination thereof, HARQ controller 402 in this embodiment is implemented as hardware running instructions loaded from firmware. The HARQ controller determines all functions related to the HARQ memory management, as well as storage and retrieval of data from the internal and external HARQ memories.

HARQ controller 402 has connections, which are indicated by the dotted lines to and from HARQ controller 402 in FIG. 4, for sending and receiving control, status, and data signals to and from LLR Soft Bits 410, internal HARQ memory 404, combining buffer 406, scratch buffer 408, and external HARQ memory 430. As transport blocks come in, HARQ controller 402, which has already performed memory allocation, sends control signals routing the transport/code blocks either on-chip or off-chip. More specifically, the transport/code blocks are split according to the memory allocation between internal HARQ memory 404 and external HARQ memory 430. The transport/code blocks destined for external HARQ memory 430 must be transmitted over bus 420 to their destination. HARQ controller 402 also sends and/or has sent control signals to both internal HARQ memory 404 and external HARQ memory 430 appropriately initializing and allocating memory spaces for the incoming transport/code blocks.

Compression and/or transformation of the soft bits is typically performed immediately before storage, sometimes as an integral part of the storage process. However, the location of compression/transformation according to the present disclosure is not so limited, and may be performed at a number of locations. Moreover, those functions may be divided and/or pipelined and performed at several locations. For example, soft bits destined for the external memory 430 may be compressed/transformed before they are transmitted over bus 420, as part of being stored in external memory 430, or both.

If a transport block is re-transmitted (i.e., if an error was detected in the previously-received transport block which is presently stored in the HARQ buffer), the new transport block needs to be combined with the old transport block. If the old transport block is stored entirely in the internal HARQ memory 402, one or more new and old code blocks (depending on the size of combining buffer 406) will be moved around solely on-chip in order to be combined in combining buffer 406 and then re-stored. If, for example, a stored/old transport block is split between internal HARQ memory 404 and external HARQ memory 430, the on-chip code blocks are combined and re-stored, and then, as discussed above in reference to FIG. 3, the off-chip code blocks are combined and re-stored. Thus, the off-chip code blocks will be transferred from external HARQ memory 430, over bus 420, and into scratch buffer 408 in order to be combined in combining buffer 406. As shown by the example of FIG. 3, using scratch buffer 408, at least one code block can be uploaded/downloaded from external memory at the same time as at least one code block is combined and re-stored into scratch buffer 408, thereby reducing HARQ combining drops.

Using the same principle as shown by example in FIG. 3, a further pipeline and/or memory hierarchy may be implemented to ensure that any number of off-chip code blocks will be available for combining on-chip when needed. For example, one or more intermediate "caches" of sorts could be implemented in the data path from external HARQ memory 430 to scratch buffer 408, such as, e.g., a "cache" between external HARQ memory 430 and bus 420 which would reduce the latency caused by reading code blocks from external HARQ memory 430, or a similar "cache" between bus 420 and scratch buffer 408 (which could be on-chip and/or off-chip).

As would be understood by one of ordinary skill in the art, on-chip memories such as internal HARQ memory 404, combining buffer 406, and scratch buffer 408 could be implemented as any of Static Random Access Memory (SRAM), Dynamic Random Access Memory (DRAM), etc. Similarly, one of ordinary skill in the art would understand that external HARQ memory 430 may be implemented as any of SRAM, DRAM, Synchronous DRAM (SDRAM), Double Date Rate (DDR) SDRAM, etc. In short, the external and internal memories are any systems in which data can be stored and then retrieved from, as will be clear to those of skill in the art. Bus 420 may be any suitable interface, such as, for example, ARM Advanced eXtendible Interface (AXI), and may be implemented in a large variety of ways, as would be understood by one of ordinary skill in the art.

III. An Embodiment Using Both HAM) Contiguous Memory Allocation and HAW) Splitting As mentioned above, some embodiments of the present disclosure combine different embodiments of HARQ contiguous memory allocation with different embodiments of HARQ memory splitting.

Figure 5:
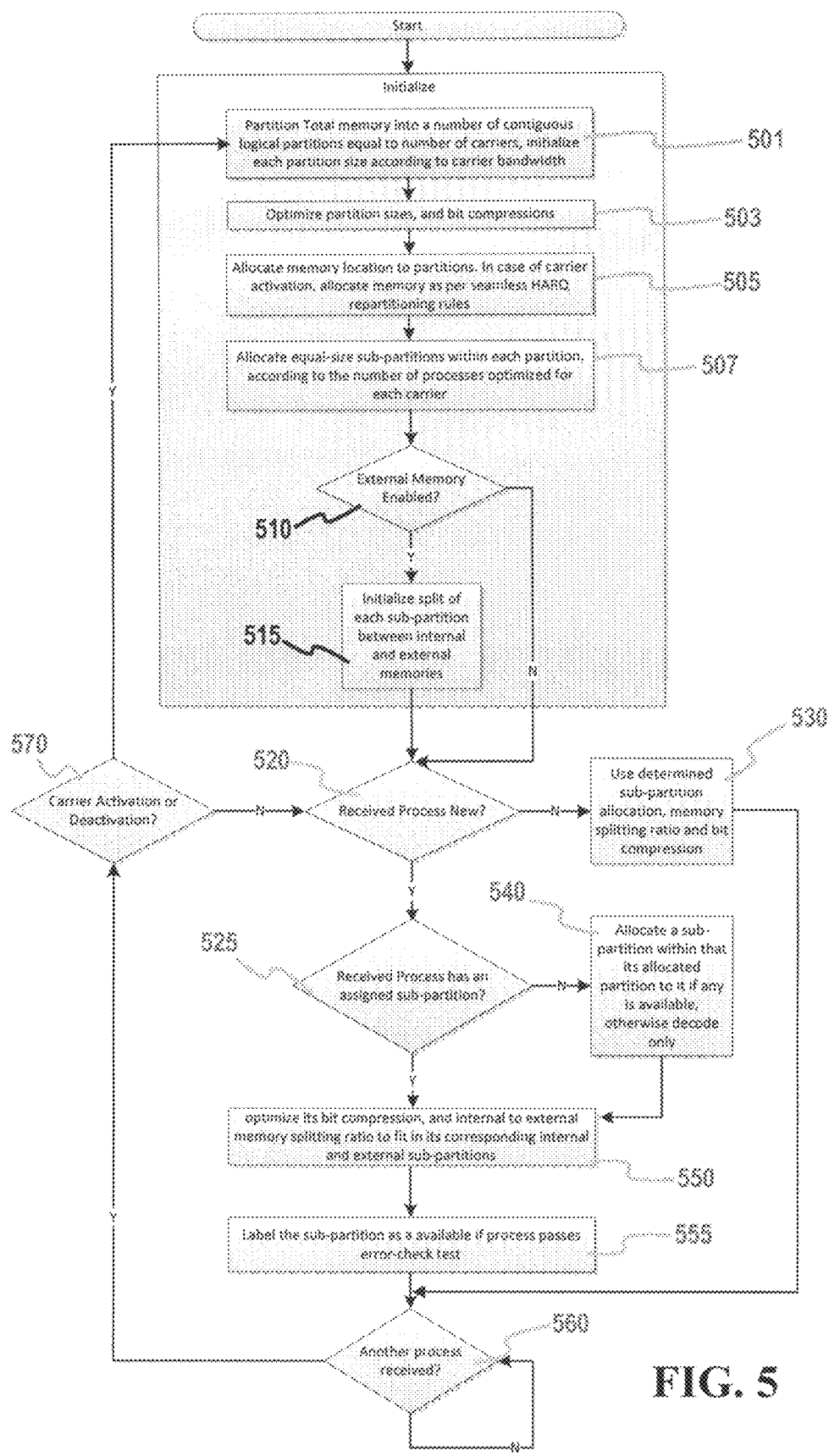
FIG. 5 is a flowchart of an embodiment of the present disclosure combining HARQ contiguous memory allocation with HARQ memory splitting.

FIG. 5 is a flowchart of an embodiment of the present disclosure combining HARQ contiguous memory allocation with HARQ memory splitting.

In step 501, the number of HARQ buffer partitions is set to be equal to the number of active CCs, and the partitions' relative sizes are initially set to be proportional to the bandwidths of their corresponding CCs. In step 503, the partition sizes and the compression levels for the partitions are optimized. In this embodiment, the optimization criterion is the largest number of transport blocks that can be fitted in the HARQ buffer while having the least unutilized memory in the HARQ buffer. In step 505, the partitions are allocated memory locations in accordance with the optimum sizes determined in step 503. As discussed above, if there are active HARQ processes being stored, seamless HARQ partitioning is performed. In step 507, equal-size sub-partitions are allocated within each partition, according to the number of HARQ processes optimized for each carrier. Optimization procedure can be done according to, for example, the global optimization procedure discussed in the description of FIGS. 1A and 1B above.

In step 510, it is determined whether external memory is enabled for HARQ buffer memory allocation. If it is not, the procedure continues at step 520, as discussed below. If it is determined that external memory is enabled for HARQ buffer memory allocation, each sub-partition of the HARQ buffer is split between the internal and external memories in step 515. The relative sizes and positions of partitions/sub-partitions allocated in steps 501-503-505-507 are retained and duplicated in the external memory in the selected ratio Y %:1-Y % so that Y % of each partition/sub-partition is on-chip and the remaining 1-Y % is off-chip. This procedure can be done as described in the paragraphs describing steps 240 and 250 of FIG. 2A and the paragraphs following that description.

In step 520, it is determined whether a received transport block is from a new HARQ process. If it is not from a new HARQ process, the received transport block is stored in its active sub-partition pursuant to the previously determined sub-partition allocation, memory splitting ratio, and compression level in step 530. If it is from a new HARQ process, it is determined in step 525 whether the HARQ process has an assigned sub-partition. If the HARQ process does not have an assigned sub-partition in step 525, it is determined whether there are any available sub-partitions in the partition of its CC in step 540. If there is an available sub-partition, the transport block is stored there; if not, it is not stored in the HARQ buffer.

If the HARQ process has an assigned sub-partition in step 525, the compression level for storing the received transport block is optimized and the transport block stored in the HARQ buffer in step 550. If the HARQ buffer is split, the internal to external memory splitting ratio is also optimized and the appropriate portions of the transport block are stored in the internal and external memories. If the actual throughput allocation is smaller than the maximum throughput allocation allowed, then the transport block will require less memory, and the bit compression is re-optimized for that transport block to allow storage in higher fidelity while minimizing the unutilized memory in the sub-partition allocated for that transport block. After the transport block is appropriately stored in step 550, the procedure continues at step 555.

In step 555, if the transport block is found to be error-free, i.e., it passes the Cyclic Redundancy Check (CRC) test, its sub-partition becomes available for storage of another transport block. After this, the procedure waits for another HARQ process and/or a new transport block to arrive when the HARQ process constitutes multiple transport blocks, at step 560. If a HARQ process arrives in step 560, it is determined, in step 570, whether a carrier has been activated or deactivated. If a carrier has been activated/deactivated, the initialization process of steps 501-503-505-507-510-515 is performed again. If a carrier has not been activated/deactivated, the HARQ processing of steps 520-525-530-540-550-555 is performed again.

Depending on the embodiment of the present disclosure, steps and/or operations in accordance with the present disclosure may occur in a different order, or in parallel, or concurrently for different epochs, etc., in different embodiments, as would be understood by one of ordinary skill in the art. Similarly, as would be understood by one of ordinary skill in the art, FIGS. 1, 2A, and 5 are simplified representations of the actions performed, and real-world implementations may perform the actions without making "decisions" as are made in step 120 of FIG. 1A, step 210 in FIG. 2A, and steps 510, 520, 525, 560, and 570 in FIG. 5. Similarly, as simplified representations, FIGS. 1, 2A, and 5 do not show other required steps as these are known and understood by one of ordinary skill in the art and not pertinent and/or helpful to the present description.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the present disclosure have been shown and described herein, it will be understood by those of ordinary skill in the art that various changes in form and details may be made therein without departing from the spirit and scope of the present disclosure—i.e., the invention is not limited to any embodiments described herein, but is defined by the appended claims and their equivalents.

What is claimed is:

1. A User Equipment (UE), comprising:
a modem chip comprising:
a downlink (DL) Hybrid Automatic Repeat reQuest (HARQ) buffer controller which, when at least one of a number of active component carriers (CCs) allocated to the UE changes, a number and/or size of HARQ processes changes, a transmission mode changes, and HARQ processing is initiated, performs pre-partitioning by:
setting a number of partitions equal to the number of active CCs;
setting relative sizes of the partitions to be proportional to the capacity of their corresponding CCs;
selecting optimum compression levels and number of HARQ processes for each partition using one or more criteria; and
allocating the entire HARQ buffer memory with the set number of HARQ buffer partitions having the set relative sizes, where each partition has a number of sub-partitions equal to the selected optimum number of HARQ processes for that partition.

2. The UE of claim 1, wherein the modem chip further comprises an on-chip memory and the UE further comprises:
an off-chip memory; and
a bus connecting the off-chip memory and the modem chip,
wherein the HARQ buffer controller determines an optimum ratio of the on-chip memory available for the DL HARQ buffer to the off-chip memory available over the bus for the DL HARQ buffer and allocates each partition and sub-partition of the logical HARQ buffer memory between the on-chip memory and the off-chip memory in accordance with the determined optimum ratio.

3. A method of allocating a user equipment (UE) downlink (DL) Hybrid Automatic Repeat reQuest (HARQ) buffer, comprising:

pre-partitioning the HARQ buffer by:
    setting a number of partitions equal to a number of active component carriers (CCs);
    setting relative sizes of the partitions to be proportional to the capacity of their corresponding CCs;
    selecting optimum compression levels and number of HARQ processes for each partition using one or more criteria; and
    allocating the entire HARQ buffer memory with the set number of HARQ buffer partitions having the set relative sizes, where each partition has a number of sub-partitions equal to the selected optimum number of HARQ processes for that partition,
wherein pre-partitioning is performed when at least one of the number of active CCs changes, the number and/or size of HARQ processes changes, the transmission mode changes, and HARQ processing is initiated.

4. The method of claim 3, wherein, if active HARQ processes are stored in the HARQ buffer when pre-partitioning is performed, allocating the entire HARQ buffer memory comprises:
    allocating the partitions and sub-partitions such that active HARQ processes can be moved to new memory locations from their old memory locations.

5. The method of claim 3, further comprising:
    when a transport block is received which is smaller than its allocated sub-partition, determining whether its selected compression level can be reduced so that the transport block may more fully occupy its allocated sub-partition.

6. The method of claim 3, further comprising, when the number of active HARQ processes of a CC exceeds the number of sub-partitions allocated to that CC in the HARQ buffer:
    when a transport block received for another HARQ process of that CC and stored in its allocated sub-partition is decoded and no errors detected, its allocated sub-partition becomes available and a transport block of an extra HARQ process is stored there.

7. The method of claim 3, further comprising, when the number of active HARQ processes of a CC exceeds the number of sub-partitions allocated to that CC in the HARQ buffer:
    increasing compression levels for one or more sub-partitions in that partition such that the total number of active HARQ processes are allocated sub-partitions.

8. A modem chip for a user equipment (UE), comprising:
    a downlink (DL) Hybrid Automatic Repeat reQuest (HARQ) buffer controller which, when at least one of a number of active component carriers (CCs) allocated to the UE changes, a number and/or size of HARQ processes changes, a transmission mode changes, and HARQ processing is initiated, performs pre-partitioning by:
    setting a number of partitions equal to the number of active CCs;
    setting relative sizes of the partitions to be proportional to the capacity of their corresponding CCs;
    selecting optimum compression levels and number of HARQ processes for each partition using one or more criteria; and
    allocating the entire HARQ buffer memory with the set number of HARQ buffer partitions having the set relative sizes, where each partition has a number of sub-partitions equal to the selected optimum number of HARQ processes for that partition.

9. The modem chip of claim 8, wherein, if active HARQ processes are stored in the HARQ buffer when pre-partitioning is performed, the DL HARQ buffer controller allocates the entire HARQ buffer memory by at least allocating the partitions and sub-partitions such that active HARQ processes can be moved to new memory locations from their old memory locations.

10. The modem chip of claim 8, wherein, when the number of active HARQ processes of a CC exceeds the number of sub-partitions allocated to that CC in the HARQ buffer, the DL HARQ buffer controller, when a transport block received for another HARQ process of that CC and stored in its allocated sub-partition is decoded and no errors are detected, makes its allocated sub-partition available for storing a transport block of an extra HARQ process.

11. The modem chip of claim 8, wherein, when the number of active HARQ processes of a CC exceeds the number of sub-partitions allocated to that CC in the HARQ buffer, the DL HARQ buffer controller increases compression levels for one or more sub-partitions in that partition such that the total number of active HARQ processes are allocated sub-partitions.

12. The UE of claim 1, wherein the one or more criteria comprises a largest number of transport blocks that can be fitted in a HARQ buffer while having the least unutilized memory in the HARQ buffer.

13. The UE of claim 1, wherein the transmission mode changes comprise a change from a first transmission mode to a second transmission mode.

* * * * *